United States Patent
Watanabe et al.

(10) Patent No.: US 6,876,513 B2
(45) Date of Patent: Apr. 5, 2005

(54) ROTARY DISK TYPE STORAGE DEVICE

(75) Inventors: Keiko Watanabe, Tsuchiura (JP);
Tetsuya Hamaguchi, Chiyoda (JP);
Tatsuya Ito, Odawara (JP); Yuji Nishimura, Odawara (JP)

(73) Assignee: Hitachi, Ltd., Tokyo (JP)

( * ) Notice: Subject to any disclaimer, the term of this patent is extended or adjusted under 35 U.S.C. 154(b) by 51 days.

(21) Appl. No.: 10/175,495

(22) Filed: Jun. 20, 2002

(65) Prior Publication Data

US 2003/0081348 A1 May 1, 2003

(30) Foreign Application Priority Data

Oct. 25, 2001 (JP) ........................................ 2001-328144

(51) Int. Cl.[7] .............................................. G11B 5/012
(52) U.S. Cl. .................................................. 360/97.01
(58) Field of Search .......................... 360/97.01, 97.02, 360/137, 900; 361/685; 206/308.1, 387.13; 277/628; 229/125.32

(56) References Cited

U.S. PATENT DOCUMENTS

| | | | | |
|---|---|---|---|---|
| 4,771,886 A | * | 9/1988 | Johnson | .................. 206/387.13 |
| 5,469,311 A | * | 11/1995 | Nishida et al. | .......... 360/97.02 |
| 5,600,509 A | * | 2/1997 | Kawakami | ................ 360/97.02 |
| 5,671,103 A | * | 9/1997 | Tada | ........................ 360/97.01 |
| 5,677,813 A | * | 10/1997 | Yoshida et al. | .......... 360/97.02 |
| 5,722,538 A | * | 3/1998 | Neely et al. | .............. 206/308.1 |
| 6,005,768 A | * | 12/1999 | Jo | .............................. 361/685 |
| 6,047,882 A | * | 4/2000 | Sin et al. | ................ 229/125.32 |
| 6,487,039 B1 | * | 11/2002 | Bernett | ..................... 360/97.02 |
| 6,567,237 B2 | * | 5/2003 | Iwahara et al. | .......... 360/97.02 |
| 6,619,667 B2 | * | 9/2003 | Kawaguchi et al. | ........ 277/628 |

FOREIGN PATENT DOCUMENTS

JP          A-11-232862          8/1999

* cited by examiner

Primary Examiner—Tianjie Chen
(74) Attorney, Agent, or Firm—Antonelli, Terry, Stout & Kraus, LLP

(57) ABSTRACT

A rotary disk type storage device has a casing comprised of a box-shaped base casing, whose one side is opened, and a cover casing closing the open side of the base casing, in which accommodated are a magnetic disk, a spindle for rotating the magnetic disk, and an actuator for moving a magnetic head slider to a desired position on the magnetic disk. A film member having an adhesive layer is bonded to an outside of an edge portion of the casing to reduce vibrations of a side wall of the cover casing and therefore vibration-induced noise.

20 Claims, 7 Drawing Sheets

ROTARY DISK TYPE STORAGE DEVICE

BACKGROUND OF THE INVENTION

The present invention relates to a rotary disk type storage device such as a magnetic disk drive and a magnet-optical disk drive.

In a rotary disk type storage device such as a magnetic disk drive, one or more disk-like recording mediums are rotatably supported by drive means such as a spindle motor, an arm, which holds a read/write head (hereinafter simply referred to as a head), is supported pivotably in a plane almost parallel to a recording surface of the recording medium, and the arm is rotated by another drive means such as a voice coil motor to move the head to a desired position on the recording medium. These components are accommodated in a thin box-shaped casing.

Such a rotary disk type storage device is finding a widening range of applications in desk-top personal computers, notebook personal computers and audiovisual equipment. In this circumstance there is a growing demand for reducing the size, weight, noise and cost of the storage device.

For realizing lighter weight and reduced cost, it is often a conventional practice to form a box-like base casing by die-casting and a cover casing by stamping. In a small-diameter magnetic disk drive wherein magnetic disks are 2.5 inches or smaller in diameter, when reducing a thickness of the cover casing, it is typical to bend the periphery of a flat plate during stamping, because the flat plate cannot provide a sufficient rigidity.

In a magnetic disk drive, it has been known that vibrations due to rotation of a rotating magnetic disk and vibrations due to a seek operation for positioning the head by the actuator oscillate the base casing and cover casing thus generating noise. Particularly in a construction wherein a disk-shaped recording medium is secured to a free end of a shaft of the spindle motor, the recording medium is held in a cantilevered state. So, when some external force is applied to the recording medium, the shaft of the spindle motor swingingly rotates, generating vibrations.

To reduce these vibrations, measures have been taken to enhance the performance of a spindle motor, improve a spindle motor current control method, and improve an actuator control current. The vibrations, however, are difficult to eliminate completely.

Therefore, to suppress vibrations of a cover casing, which has been considered the main source of noise, a variety of proposals have been made, including forming the entire cover from a vibration damping steel plate or, as disclosed in JP-11-232862A, attaching a vibration damping steel plate to the outside of the cover casing to absorb vibrations and thereby reduce noise.

However, it is contrary to reduction of the weight as well as cost to form the entire cover casing from a vibration damping steel plate so as to suppress vibrations of the cover casing that occur during the seek operation of the actuator, because such a cover increases in thickness. The method of attaching a vibration damping steel plate to the outer surface of the cover casing not only cannot produce as high a vibration absorbing effect as expected but it also leads to a cost increase.

BRIEF SUMMARY OF THE INVENTION

The present invention has an object of solving, in a simple way, the problem of vibration-induced noise of the cover casing in the rotary disk type storage device.

The invention achieves the above objective by the following means. First, the invention is targeted at a rotary disk type storage device having a casing comprised of a box-shaped base casing with one side thereof opened and a cover casing for closing the open side of the base casing, in which accommodated are a disk-shaped recording medium, drive means for rotating the recording medium, and an actuator for moving a read-write head to a desired position above the recording medium. In a usual arrangement of these components in the casing, the recording medium and the driving means for the medium are arranged near one longitudinal end of the box-shaped base casing, and the actuator for moving the read-write head is arranged near the other longitudinal end.

Experiments have been conducted to examine vibrations of the rotary disk type storage device of the above construction, in particular those caused during the actuator-driven seek operation. The seek operation by the actuator means moving the read-write head to a desired position on the disk-shaped recording medium by such a driving means as a voice coil motor of the actuator while rotating the recording medium by another drive means such as a spindle motor. During this seek operation the cover casing and base casing vibrate and produce noise, which causes the problem to be addressed. An analysis of the vibrations has found that, as will be detailed later, a portion of the cover casing close to where the recording medium is installed vibrates in a direction perpendicular to the cover surface, which in turn causes the side wall of the cover casing to vibrate, and these vibrations induce noise.

Based on this finding, the present invention features providing connecting means on the outside or external surface of an edge portion of the casing, which applies to the cover casing and the base casing a force for pressing them against each other. That is, since the vibrations of the upper surface of the cover casing cause the side wall of the cover casing to vibrate and generate noise, the provision of the connecting means that applies a force to the cover casing and the base casing for pressing them against each other can damp the vibrations of the side wall of the cover casing. Particularly, placing the connecting means on the outside or outer surface of the edge portion of the casing can effectively damp the vibrations of the side wall of the cover casing. This in turn enables reduction of the vibration-induced noise of the cover casing.

This noise reduction is most effective in the rotary disk type storage device of the construction in which the base casing has thick portions formed at at least corners of its periphery and the cover casing is secured to the base casing by threaded fasteners screwed into the thick portions.

The connecting means can easily be realized by bonding a film member having an adhesive layer to an area ranging from an upper surface of the cover casing through a side surface of the cover casing to a side surface of the base casing. In this case, the film member can be bonded to an edge portion of the casing, which lies on an opposite side to the actuator with a rotary shaft of the drive means for rotating the recording medium interposed therebetween. It is particularly preferred that the film member be bonded while applying a tensile force between the cover casing and the base casing. It is also preferable to have the film member bonded so that an end of the film member on the upper surface side of the cover casing extends to a central part of the upper surface of the cover casing.

Particularly, the film member may be formed in one-piece part with a product label that indicates descriptions of the rotary disk type storage device. This allows the invention to be implemented by simply changing the shape of the existing product label conventionally attached on the upper surface of the cover casing. In this way, vibrations of the cover casing can be damped most easily.

The connecting means of the invention is not limited to the film member described above and may have the following construction. That is, the connecting means can be realized by extending a part of the side wall, which is formed by bending the periphery of the cover casing toward the base casing, bending the extended part toward the underside of the base casing, and engaging the bent part with an underside edge portion of the base casing. The bent portion is preferably formed at the side wall of the cover casing, which lies on an opposite side to the actuator with respect to the rotary shaft of the drive means for rotating the recording medium. To have this bent portion apply to the cover casing and the base casing a force for pressing them against each other, a plastic deformation force of the cover casing may be used, but it is preferred that an elastic cushion material be inserted between the bent portion and the base casing or between the opposing parts of the cover casing and base casing.

The above-described and other objects, features and advantages of the invention will become apparent from the following description of the embodiments of the invention taken in conjunction with the accompanying drawings.

DETAILED DESCRIPTION OF THE INVENTION

Figure 1:
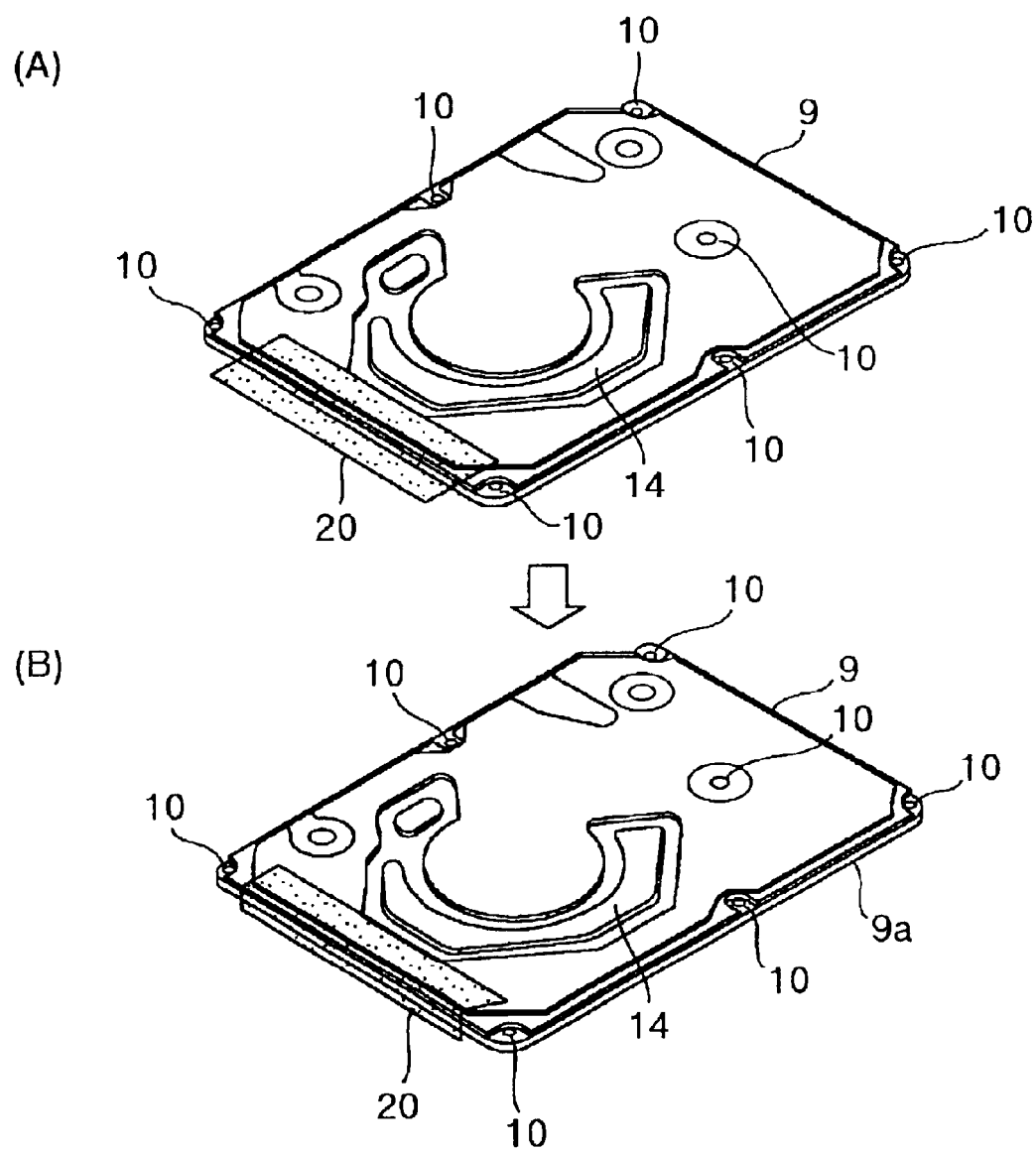
FIGS. 1A and 1B are outside views of an embodiment of the invention in which a film member is bonded to a magnetic disk drive.
Figure 2:
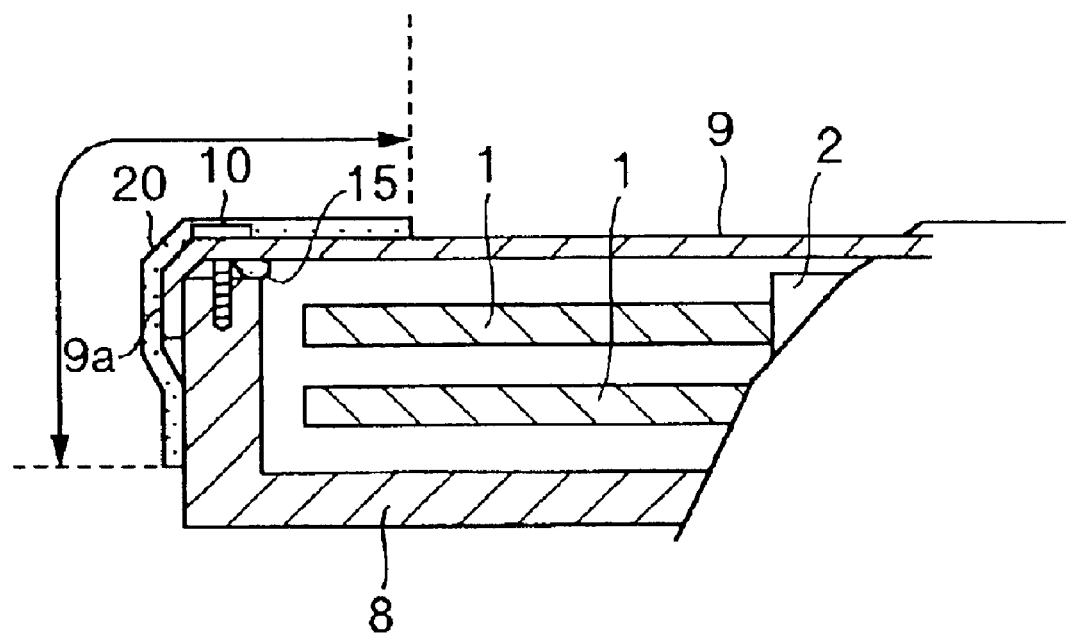
FIG. 2 is an explanatory view in which a part of FIG. 1 is cut away and enlarged.
Figure 3:
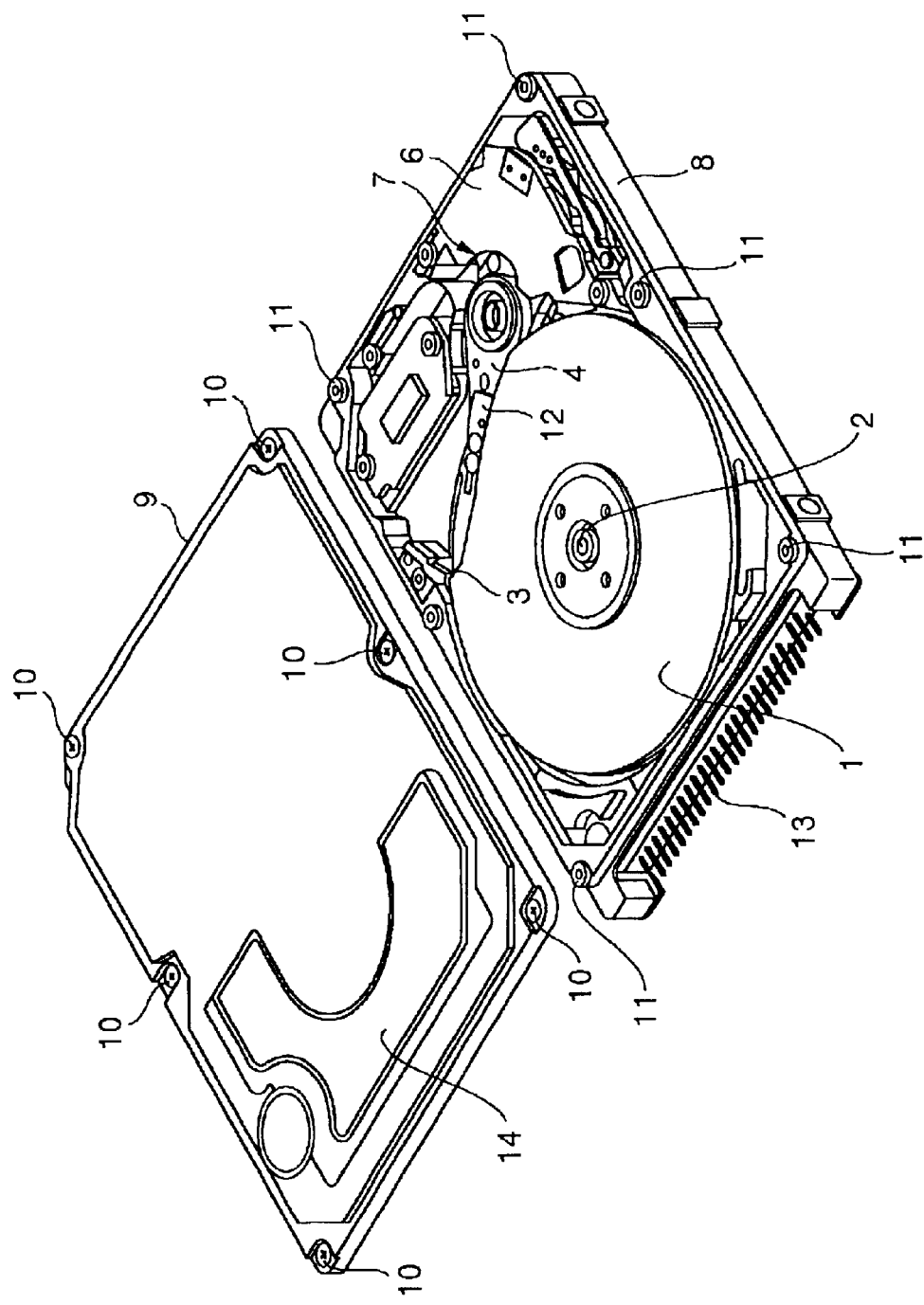
FIG. 3 is an outside view showing the overall construction of the magnetic disk drive, at which the invention is targeted, in a state of removing a cover casing.
Figure 4:
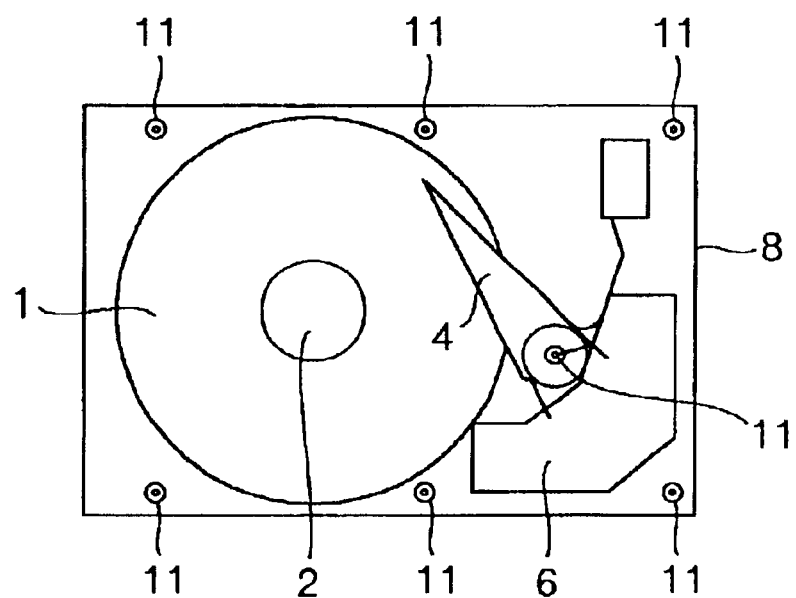
FIG. 4 is a view for explanation of the arrangement of parts in a base casing and the locations of screws for fastening together a cover casing and the base casing.
Figure 5:
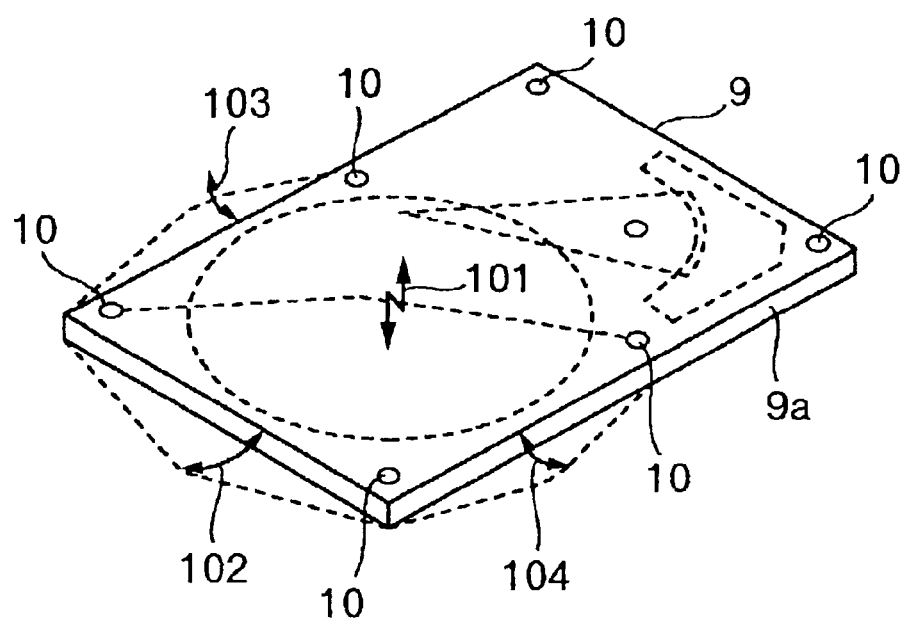
FIG. 5 is a view for explanation of vibration modes of the cover casing.

Description will be now made, with reference to FIGS. 1 to 5, on an embodiment in which the invention is applied to a magnetic disk drive. FIGS. 1A and 1B are outside views of the embodiment in which a film member is bonded to the magnetic disk drive according to the invention. FIG. 2 is an explanatory view in which a part of FIG. 1 is cut away and enlarged. FIG. 3 is a view showing the overall construction of the magnetic disk drive, at which the invention is targeted, in a state of removing a cover casing. FIG. 4 is a view for explanation of the arrangement of parts in a base casing and the locations of screws for fastening together the cover casing and the base casing. FIG. 5 is a view for explanation of vibration modes of the cover casing.

The size of the casings of magnetic disk drives is standardized. In the case of a 2.5-inch type, for example, the drive has a construction as shown in FIG. 3. More specifically, one or more magnetic disks 1, serving as recording mediums, are secured to a spindle 2 of a spindle motor to be rotatable with it. A magnetic head slider 3 for reading information from and writing information to the magnetic disk 1 is attached to the free end of an arm 4. The arm 4 is pivotally supported on a pivot shaft 5, which is arranged outside the magnetic disk 1, so as to be pivotable in a plane almost parallel to a recording surface of the magnetic disk 1. The arm 4 is rotated about the pivot shaft 5 by an actuator 7, which includes a suspension 12, a voice coil motor 6, etc., to move the magnetic head slider 3 to a desired position above the magnetic disk 1.

These parts are accommodated in a base casing 8 that is formed in a shape of thin rectangular box with one side thereof opened. As to the arrangement of the parts in the base casing 8, the magnetic disk 1 secured to the spindle 2 is located near one longitudinal end of the base casing 8. Near the other longitudinal end of the base casing 8 are arranged the pivot shaft 5 of the arm 4, the voice coil motor 6 and the actuator 7.

The opening of the base casing 8 is hermetically covered with a cover casing 9. The cover casing 9 is in a thin box shape with its side walls 9a formed by bending a peripheral portion of the cover casing 9 toward the base casing 8. The cover casing 9 is secured to the base casing 8 by a plurality of screws 10 with a seal member interposed therebetween. The screws 10, which fasten the base casing 8 and the cover casing 9 together, are naturally located at thick portions of the base casing 8 where screw holes can be formed. Therefore, as shown in FIG. 3 and FIG. 4, the thick portions are provided at a total of six locations, i.e., at four corners of the base casing 8 and at two locations near the center of each longer side of the base casing 8. Threaded holes 11 are formed in these thick portions. The two thick portions of the longer sides of the base casing 8 are shifted from the center to avoid the magnetic disk 1. In the example shown, the base casing 8 and the cover casing 9 are secured to the pivot shaft 5 by screws. On the underside of the base casing 8 is mounted a control circuit board that has a plurality of terminals 13 for external connection. The cover casing 9 is formed with recesses of various shapes on its outer surface. Particularly, a recess 14 is provided for attaching a vibration damping steel plate as described above and is not necessary in this embodiment.

Now, vibrations of the cover casing 9 will be explained. In the case of a 3.5-inch type magnetic disk drive, the diameter of a magnetic disk is large and thus a more strict, positioning accuracy is required. Therefore, both ends of the spindle motor are often supported on both the base casing and the cover casing. In that case, the cover casing and the base casing can be secured to the bearings of the spindle motor. In a small-diameter magnetic disk drive of 2.5-inch or less, like the embodiment shown in FIG. 3, however, because of the need for space saving, commonly employed is a cantilevered construction in which an end of the spindle 2 on a side where the magnetic disk 1 is securely mounted is not supported.

Accordingly, in the construction as shown in FIG. 3, when performing a seek operation with the actuator 7 by driving the voice coil motor 6 while rotating the magnetic disk by the spindle motor, the magnetic disk 1 may have an external force acting thereon, which in turn may cause swinging rotation and oscillation of the spindle, resulting in vibrations of the cover casing 9 and the base casing 8. Analysis of the vibrations has found that, as shown in FIG. 5, there is a vibration mode 101 in which a portion of the cover casing 9 directly above the magnetic disk 1 vibrates inwardly and outwardly, triggering other vibration modes 102, 103, 104 in which the side walls of the cover casing 9 between the screws 10 vibrate, and that these vibration modes cause noise.

Vibrations in these vibration modes 101, 102, 103, 104 are maximum in amplitude at locations farthest from the screws 10 because the screws 10 work as fixed ends of vibrations. More specifically, in the case of the magnetic disk drive of FIG. 3, the portion of the cover casing 9 directly facing the magnetic disk 1 and the side wall portions of the cover casing 9 between the screws 10 around the magnetic disk 1 have large vibrations. To reduce the amplitudes of large cover vibrations around the magnetic disk 1, the film member 20 having an adhesive layer as shown in FIG. 1 is bonded to an edge portion of the casing on the opposite side to the actuator 7 with respect to the spindle 2. That is, at the shorter side of the base casing 8, on which side the magnetic disk 1 is arranged, the film member 20 with an adhesive layer is bonded over a range extending from the upper surface of the cover casing 9 through the side surface of the cover casing 9 to the side surface of the base casing 8.

The way of bonding the film member 20 will be now explained with reference to FIGS. 1A, 1B and FIG. 2. FIG. 2 schematically shows the bonding position of the film member 20. As shown in the figure, the cover casing 9 is put on the base casing 8 with its side wall portions fitted over the upper end portion of the side walls of the base casing 8. A packing 15 is installed between the cover casing 9 and the upper end face of the side walls of the base casing 8 to hermetically seal the contact portion between the cover casing 9 and the base casing 8 upon fastening of the screws 10. The film member 20, as shown in FIG. 1A and FIG. 1B, is attached to a portion of the casing edge between two adjacent screws 10 provided at two corners of the shorter side of the casing. The film member 20 is preferably bonded as one piece to an area 21 between the screws 10 that extends from a position on the upper surface of the cover casing 9 inside the edge of the magnetic disk 1 through the outer surface of the side wall 9a of the cover casing 9 to the outer surface of the side wall of the base casing 8.

The film member 20 is preferably made of, but is not limited to, materials that are suited for damping vibrations. For example, commonly used sheet materials such as paper, plastics, rubber, and a mixed material of these, which have an adhesive layer, may be used. When the film member 20 is bonded, it is preferred that the film member 20 be stretched while being bonded. This applies a tensile force of the film member 20 between the cover casing 9 and the base casing 8, thereby enabling further enhancement of the vibration damping effect. To ensure that the tensile force reliably acts on the cover casing 9 and the base casing 8 even when the film member 20 shrinks due to changes in ambient temperature, it is preferred that when the assembling is done at room temperature, a somewhat stronger tensile force be applied while bonding the film member 20 or that the film member 20 be warmed and stretched as it is bonded.

As having described above, the embodiment of FIG. 1 has an advantage of enabling noise reduction by damping vibrations of the cover casing 9 with a simple method of bonding the film member 20 to the casing edge portion on the opposite side to the actuator 7 with respect to the spindle.

Figure 6:
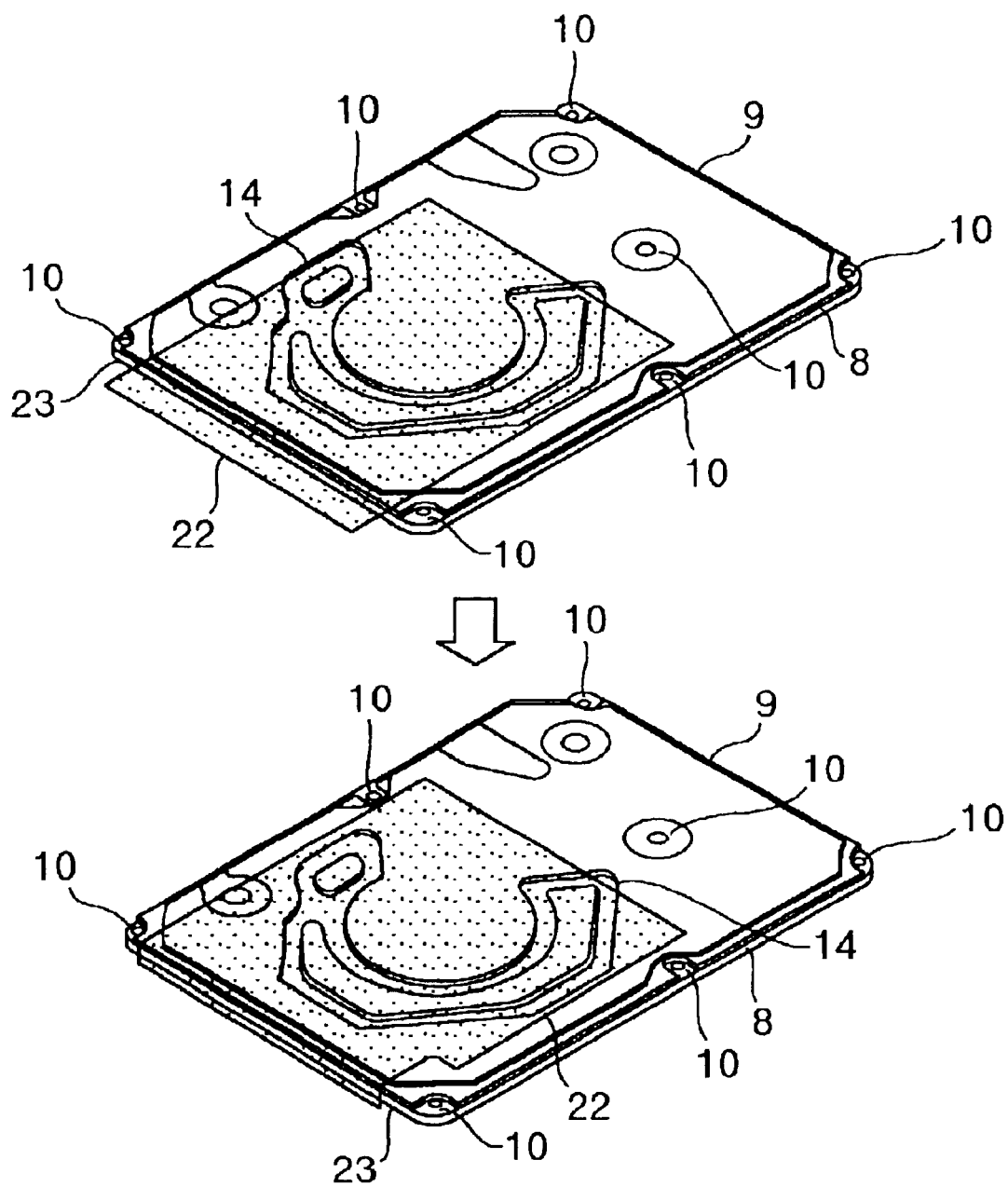
FIG. 6 is an outside view of another embodiment of the invention in which a film member serving also as a product label is bonded to a magnetic disk drive.
Figure 7:
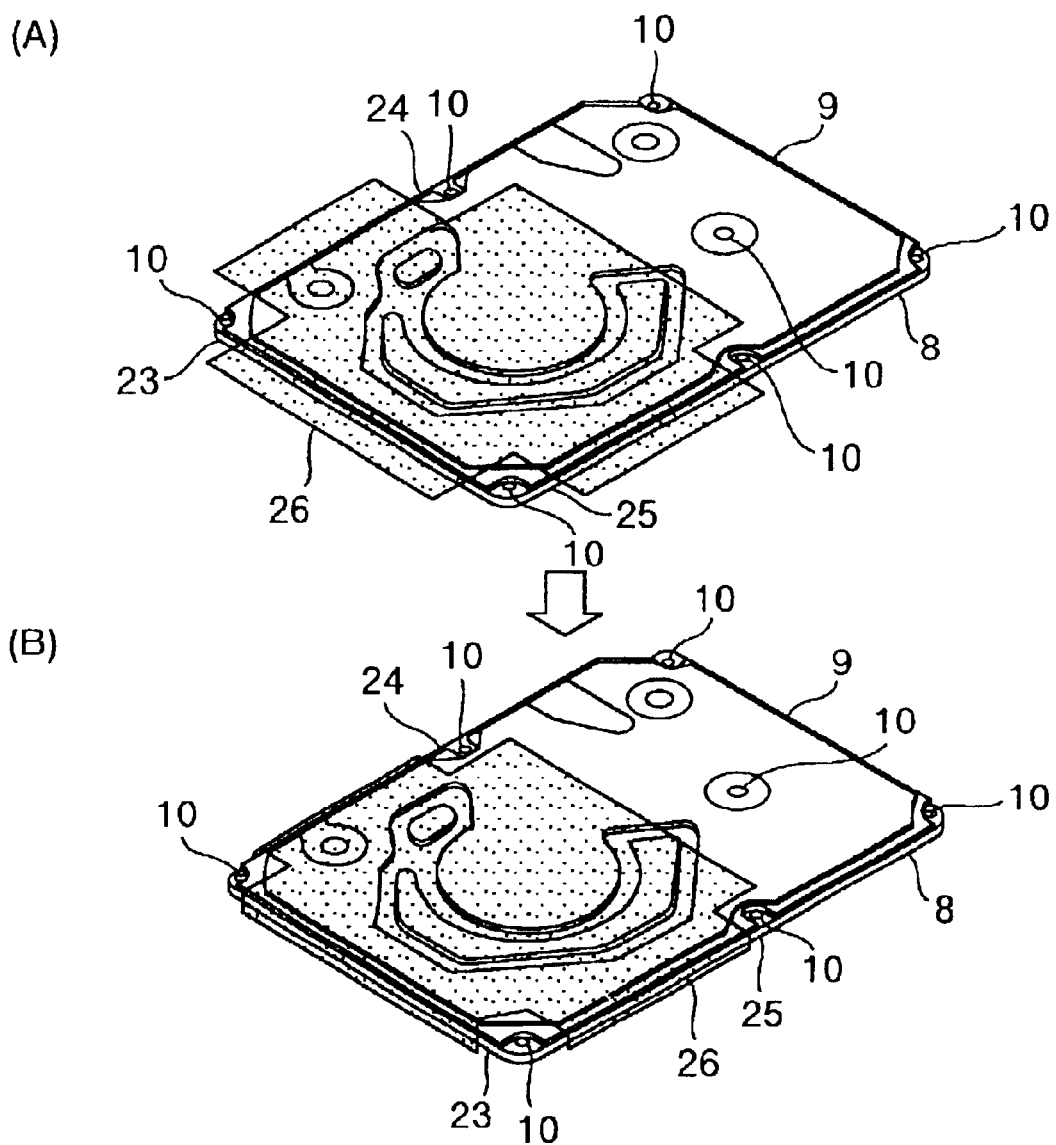
FIGS. 7A and 7B are outside views of still another embodiment of the invention in which a film member serving also as a product label is bonded to a magnetic disk drive.

Other embodiments of the invention are shown in FIG. 6 and FIGS. 7A, 7B. FIG. 6 shows the embodiment in which a product label (or identification label) 22 attached to the upper surface of the cover casing 9 is extended to the casing edge portion 23 on the opposite side to the actuator 7 and bonded over a range including the side surface of the base casing 8, thus serving also as the film member 20. Also in this case, it is effective in enhancing the vibration damping effect to apply a tensile force to the product label 22 as it is bonded to the casing.

The embodiment shown in FIGS. 7A and 7B has a film member bonded, which serves as an identification label of the drive in a manner similar to FIG. 6. The area where the identification label 26 is attached to the casing edge portion of the cover casing 9 and base casing 8 is extended from the area of FIG. 6 to longer side edges 24, 25 of a casing portion in which the magnetic disk 1 is installed. The longer side edges 24, 25 are sides of the casing portion between the screws 10 where the magnetic disk 1 is installed. Also in this case, the identification label 26 is bonded while applying a tensile force.

The embodiments of FIG. 6 and FIGS. 7A, 7B utilize the film members use the materials of the currently used product/identification labels, such as plastics and paper. For example, the label used on the current product to indicate specifications of the drive occupies ⅓ to ½ of the area of the cover. Therefore, in either example of FIG. 6 or FIGS. 7A and 7B, the label covers an area of the cover casing immediately above the magnetic disk 1. Since this area corresponds to the area where the amplitudes of cover vibrations are large, the cover vibration damping effect is enhanced.

Figure 8:
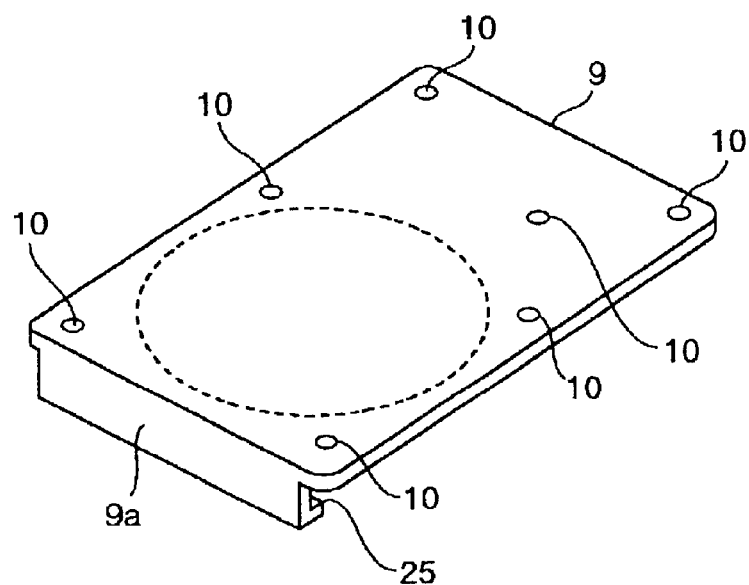
FIG. 8 is an outside view of still another embodiment of the invention, showing a connecting member for damping vibrations of a magnetic disk.
Figure 9:
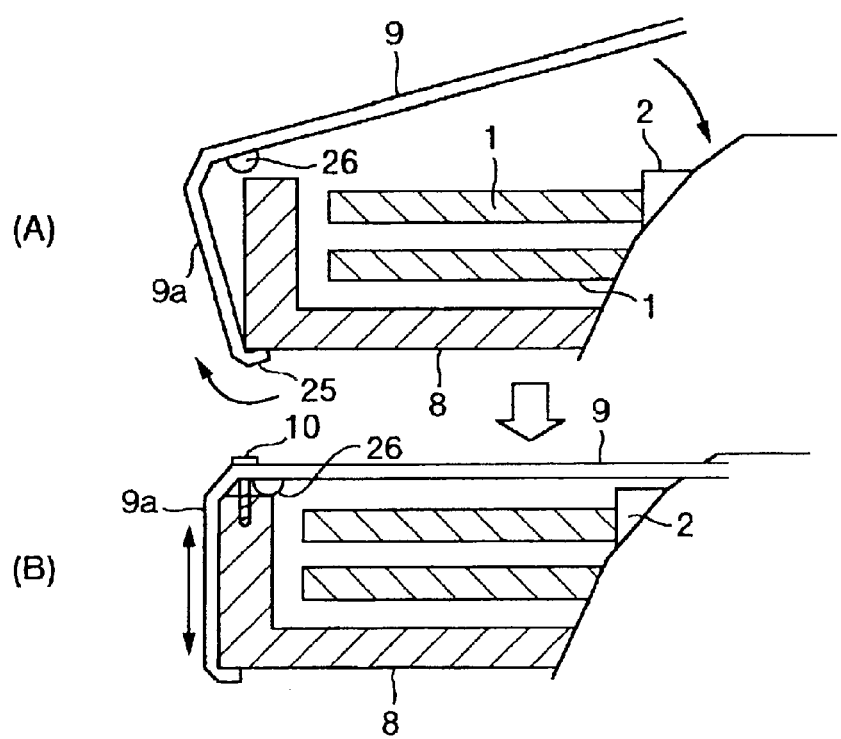
FIGS. 9A and 9B are explanatory views in which a part of the embodiment of FIG. 8 is cut away and enlarged.

FIG. 8 shows a cover casing according to a further embodiment of the invention. The cover casing 9 of this embodiment has a side wall 9a which is formed by bending a peripheral portion of the cover casing 9 toward the base casing 8, as in the previous embodiment. The side wall 9a at the shorter side of the cover casing 9 on the opposite side to the actuator 7 with respect to the magnetic disk driving spindle 2 is extended and bent toward the underside of the base casing 8 to form a bent portion 25 which functions as connecting means. The bent portion 25 is intended to engage with an underside edge portion of the cover casing 9. The bent portion 25 is formed by adding a bending step to the stamping process for the cover casing. In assembling the cover casing 9 thus formed, as shown in FIGS. 9A and 9B, the bent portion 25 is engaged with the underside corner or edge of the base casing 8, and then the entire cover casing 9 is put over the base casing 8. At this time, to connect together the cover casing 9 and the base casing 8 with a tension applied between them, it is preferable to provide a cushion member 26 on the inner surface of the cover casing 9 at a position facing the upper end of the side wall of the base casing 8. Thus, upon fastening the screws 10, a force is caused for pressing the cover casing 9 and the base casing 8 against each other. It is also preferred that the inner height dimension of the bent portion 25 be set smaller by approximately a tolerance (e.g., 50–100 μm) than the height dimension of the side wall of the base casing 8.

As having described above, according to the invention, it is possible to reduce the noise induced by vibrations of the cover casing of the rotary disk type storage device with a simple method.

It will be understood by those skilled in the art that the foregoing description has been made on the embodiments of the invention and that various changes and modifications may be made in the invention without departing from the spirit of the invention and the scope of the appended claims.

What is claimed is:

1. A rotary disk type storage device comprising:
   a casing comprised of a box-shaped base casing with one side thereof opened and a cover casing for closing the open side of the base casing;
   a disk-shaped recording medium accommodated in the casing;
   drive means accommodated in the casing for rotating said recording medium;
   an actuator accommodated in the casing for moving a read-write head to a desired position above the recording medium;
   fasteners which fasten the cover casing to the base casing; and
   connecting means provided on an outside of an edge portion of the casing to apply a force to the cover casing and the base casing for pressing them against each other so as to enable vibration damping of the casing during operation of the rotary disk type storage device.

2. The device according to claim 1, wherein the base casing has thick portions formed at a position of at least corners of a periphery thereof and the cover casing is secured to the base casing with the fasteners which are threaded fasteners screwed into said thick portions.

3. The device according to claim 1, wherein said connecting means comprises a film member having an adhesive layer which is bonded to the casing from an upper surface of the cover casing through a side surface thereof to a side surface of the base casing.

4. The device according to claim 3, wherein said film member is bonded to an edge portion of the casing, which lies opposite to the actuator with a rotary shaft of the drive means for rotating the recording medium interposed therebetween.

5. The device according to claim 3, wherein said film member is bonded to the casing while applying a tensile force to said film member so as to enable pressing of the cover casing and the base casing to one another.

6. The device according to claim 3, wherein an end of said film member on an upper surface side of the cover casing extends to a central part thereof.

7. The device according to claim 3, wherein said film member is formed in one-piece part with a product label which indicates an explanation of the rotary disk type storage device.

8. The device according to claim 1, wherein said cover casing has a side wall formed by bending a periphery of the cover casing toward the base casing, and said connecting means is formed by extending a part of said side wall of the cover casing, which lies opposite to the actuator with a rotary shaft of the drive means for rotating the recording medium interposed therebetween, bending said part toward an underside of the base casing, and engaging said bent portion with an underside edge portion of the base casing.

9. A rotary disk type storage device comprising:
   a casing comprised of a box-shaped base casing with one side thereof opened and a cover casing for closing said open side of the base casing, said base casing having thick portions formed at a position of at least a total of six locations, including four corners of a periphery of the base casing and central portions of two opposite side walls of the periphery, said cover casing having a side wall formed by bending a periphery thereof toward the base casing and being secured to the base casing through a sealing member by at least six threaded fasteners screwed at the thick portions;
   a disk-shaped recording medium accommodated in the casing;
   drive means accommodated in the casing for rotating the recording medium;
   an actuator accommodated in the casing for moving a read-write head to a desired position above the recording medium; and
   connecting means provided on an outer surface of an edge portion of the casing to apply a force to the cover casing and the base casing for pressing them against each other so as to enable vibration damping of the casing during operation of the rotary disk type storage device.

10. The device according to claim 9, wherein said connecting means comprises a film member having an adhesive layer which is bonded to the casing at an edge portion of the casing situated between the threaded fasteners from an upper surface of the cover casing through a side surface of the cover casing to a side surface of the base casing.

11. The device according to claim 9, wherein said connecting means comprises a film member having an adhesive layer which is bonded to the casing from an upper surface of the cover casing through a side surface thereof to a side surface of the base casing, and said connecting means is provided at an edge portion of the casing, which lies opposite to the actuator with a rotary shaft of the drive means for rotating the recording medium interposed therebetween.

12. The device according to claim 11, wherein said film member is bonded to the edge portion of the casing lying between the threaded fasteners provided at corners of the casing edge portion.

13. The device according to claim 10, wherein said film member is bonded to the casing while applying a tensile force to said film member so as to enable pressing of the cover casing and the base casing to one another.

14. The device according to claim 10, wherein an end of said film member on an upper surface side of the cover casing extends beyond a line connecting the threaded fasteners toward a central part of the cover casing.

15. The device according to claim 10, wherein said film member is formed in one-piece part with a product label which indicates an explanation of the rotary disk type storage device.

16. The device according to claim 9, wherein said cover casing has a side wall formed by bending a periphery of the cover casing toward the base casing, and said connecting means is formed by extending a part of said side wall of the cover casing, which lies opposite to the actuator with a rotary shaft of the drive means for rotating the recording medium interposed therebetween, bending said part toward an underside of the base casing, and engaging said bent part with an underside edge portion of the base casing.

17. A rotary disk type storage device comprising:
    a casing comprised of a box-shaped base casing with one side thereof opened and a cover casing for closing the open side of the base casing, said base casing having thick portions formed at appropriate locations on a periphery thereof, said cover casing having a side wall formed by bending a periphery thereof toward the base casing and being secured to the base casing through a sealing member by threaded fasteners screwed into said thick portions;

a disk-shaped recording medium accommodated in the casing and supported rotatably;

drive means accommodated in the casing for rotating the recording medium;

a head accommodated in the casing for writing information in the recording medium and reading information from the recording medium;

an arm accommodated in the casing, supporting the head and supported pivotably in a plane almost parallel to a recording surface of the recording medium; and an actuator accommodated in the casing for rotating the arm to move the head to a desired position above the recording medium; and connecting means provided on an outer surface of an edge portion of the casing to apply a force to the cover casing and the base casing for pressing them against each other so as to enable vibration damping of the casing during operation of the rotary disk type storage device.

18. The device according to claim 17, wherein said drive means comprises a spindle motor, said recording medium is secured to a free end of a shaft of said spindle motor in a cantilevered state and is arranged near one side edge of the base casing, and said actuator is arranged near the other side edge of the base casing.

19. A method for fabricating a rotary disk type storage device having a casing comprised of a box-shaped base casing with one side thereof opened and a cover casing for closing the open side of the base casing, a disk-shaped recording medium accommodated in the casing, a drive accommodated in the casing for rotating the recording medium, an actuator accommodated in the casing for moving a read-write head to a desired position above the recording medium, and fasteners which fasten the cover casing to the base casing, the method comprising the steps of providing a connection on an outside of an edge portion of the casing so as to apply a force to the cover casing and the base casing for pressing the covering casing and the base casing against each other and to enable vibration damping of the casing during operation of the rotary disk type storage device.

20. A method according to claim 19, wherein the step of providing the connection includes utilizing a film member which is stretched while bonding the film member to the casing with an adhesive from an upper surface of the cover casing through a side surface thereof to a side surface of the base casing.

* * * * *